Oct. 19, 1943.    W. W. SLOANE    2,332,176
SHAKER CONVEYER
Filed Sept. 4, 1941    4 Sheets-Sheet 1

INVENTOR.
William W. Sloane
BY
Clarence F. Poole
ATTORNEY

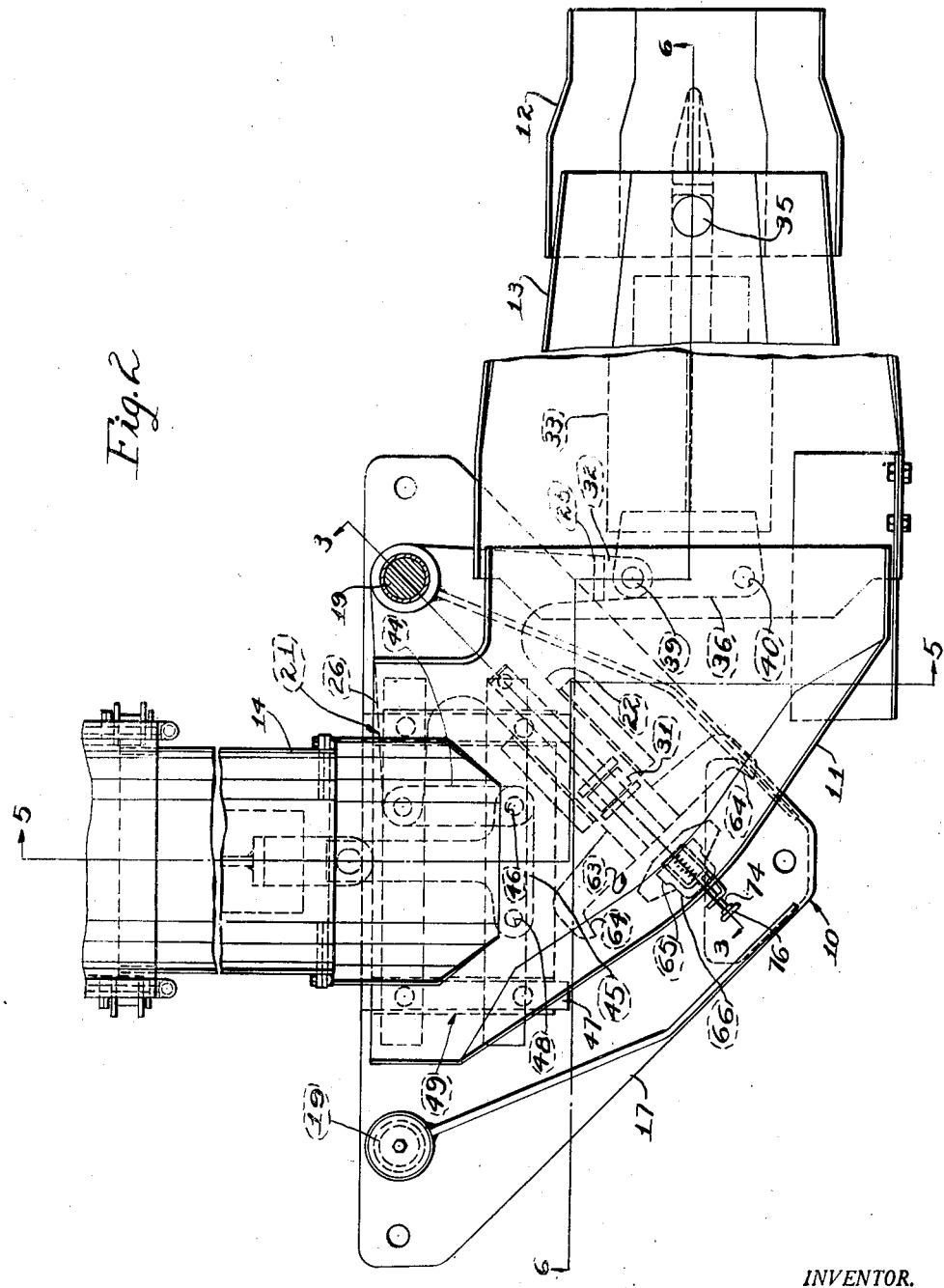

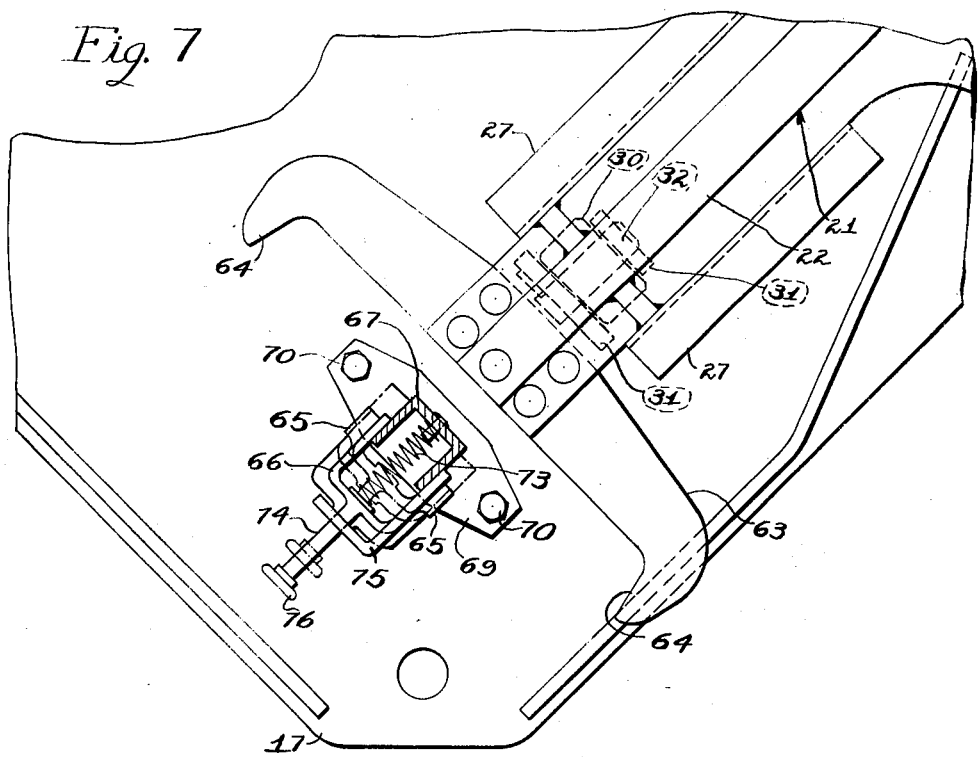
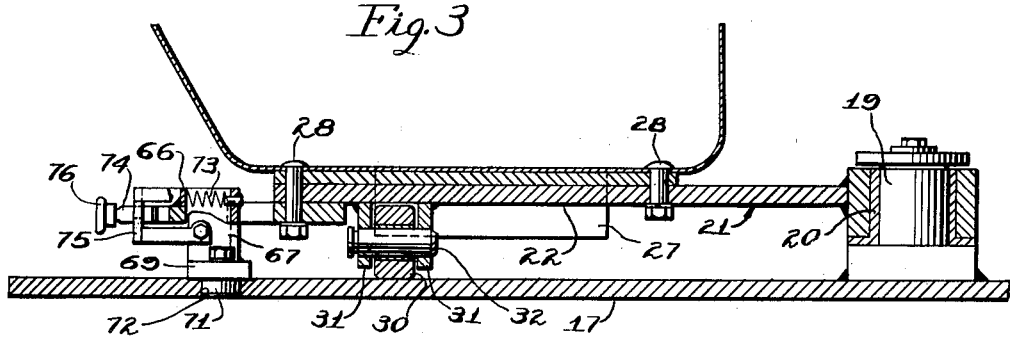
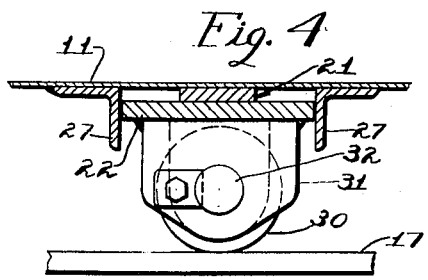

Oct. 19, 1943.     W. W. SLOANE     2,332,176
SHAKER CONVEYER
Filed Sept. 4, 1941     4 Sheets-Sheet 4
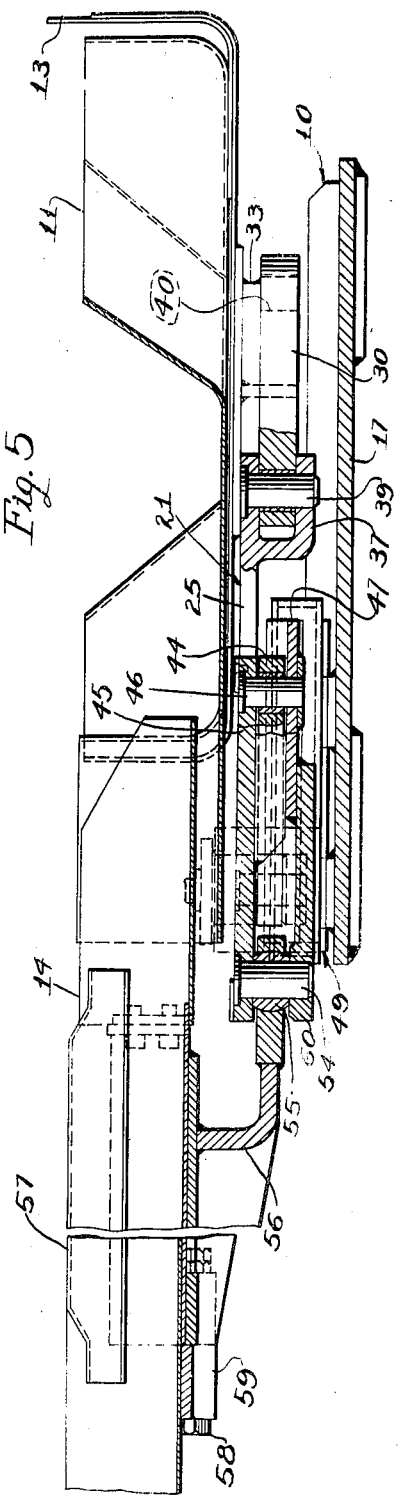
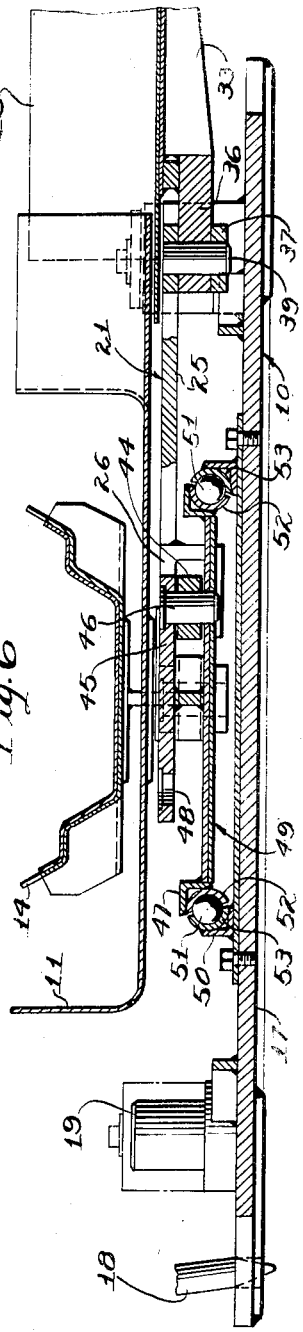
INVENTOR.
William W. Sloane
BY
Clarence F. Poole
ATTORNEY Patented Oct. 19, 1943

2,332,176

UNITED STATES PATENT OFFICE 2,332,176

SHAKER CONVEYER

William W. Sloane, Chicago, Ill., assignor to Goodman Manufacturing Company, Chicago, Ill., a corporation of Illinois Application September 4, 1941, Serial No. 409,558

12 Claims. (Cl. 198—220)

This invention relates to improvements in shaker conveyers and has as its principal objects to provide a novel and improved form of angle turn for a shaker conveyer trough line, arranged to permit the conveyer to convey material around a corner in a more efficient manner than formerly.

A further object of my invention is to provide a new and improved form of angle turn for a shaker conveyer trough line, so arranged that both the driving and driven trough sections of the conveyer may be offset from the arcuate center line of the corner pan during operation of the conveyer, without impairing the efficiency thereof.

A more specific object of my invention is to provide an angle turn for a shaker conveyer trough line including means for accurately centering the angle turn with respect to the stroke of the conveyer, to reduce the stresses on the connecting parts and the hold-down jacks therefor.

Other objects of my invention will appear from time to time as the following specification proceeds and with reference to the accompanying drawings wherein:

Figure 2 is an enlarged detail plan view of the device shown in Figure 1, with certain parts shown in section;

Figure 3 is a sectional view taken substantially along line 3—3 of Figure 2;

Figure 4 is an enlarged detail view showing certain details of the anti-friction support for the angle trough on its supporting base;

Figure 5 is a sectional view taken substantially along line 5—5 of Figure 2;

Figure 6 is a sectional view taken substantially along line 6—6 of Figure 2; and Figure 7 is an enlarged detail view of the angle turn with the angle trough removed, in order to show certain details of the centering means therefor.

Figure 1:
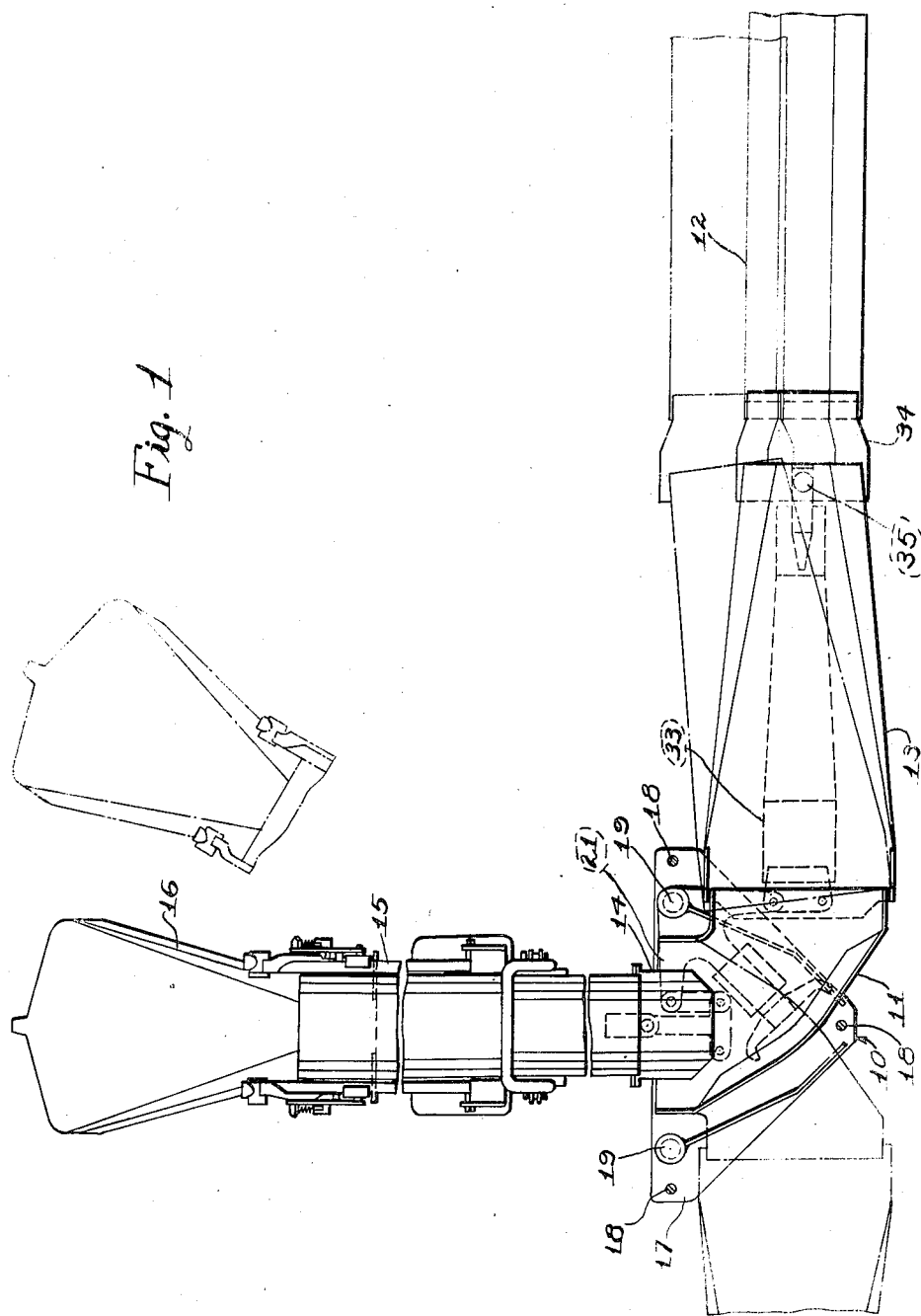
Figure 1 is a plan view of a portion of a shaker conveyer trough line, showing a corner pan constructed in accordance with my invention connected in the trough line.

In the drawings, an angle turn generally indicated by reference character 10 is shown as being connected in a shaker conveyer trough line. Said angle turn includes an angle trough 11 mounted for reciprocable movement about a fixed vertical axis and having a driving trough section 12 of a shaker conveyer trough line connected to one end thereof through a connecting trough section 13, which serves as a connecting link for connecting said driving trough section with said angle trough. A driven trough section 14, herein shown as having an extensible trough section 15 and shovel 16 mounted for telescopic movement with respect thereto, is pivotally connected to the opposite end of said angle trough, for lateral swinging movement and for vertical adjustment with respect thereto.

A base 17, adapted to be held in a stationary position on the ground by means of a plurality of jacks 18, 18, is provided for said angle turn. Said base, as herein shown, is of a generally triangular formation in plan and is provided with a pair of spaced bearing bosses 19, 19, projecting upwardly therefrom, adjacent the corners of the base of the triangle. A bearing 20 for a bell crank 21 may be mounted on either one of these bosses, depending upon whether it is desired to turn a right- or left-hand corner. The bell crank 21, as herein shown, has a radially projecting central arm 22, midway between respective driving and driven arms 25 and 26 of said bell crank. A pair of spaced angles 27, 27 depend from the bottom of the angle trough 11 and are adapted to have guiding engagement with opposite sides of said central arm, to facilitate assembly of the angle turn, and said angle trough is secured to said central arm by means of nuts and bolts 28, 28.

An anti-friction roller 30, mounted between a pair of spaced depending supporting members 31, 31 on a shaft 32 extending radially towards the pivotal axis of said bell crank is provided to support the outer end of said central arm for movement along said base plate.

The driving connection between the driving trough section 12 and the lever arm 25 of the bell crank 21 includes a link 33 having the connecting trough section 13 mounted thereon. Said link is pivotally connected with the forward end of a forward hopper-like extension 34 of said driving trough section, by means of a vertical pin 35.

The opposite end of the link 33 has a forward connecting portion 36 spaced downwardly from the underside of the connecting trough section 13, which extends between the furcations of a bifurcated end portion 37 of the lever arm 25. A pivotal pin 39 is provided to pivotally connect said connecting portion with said lever arm of said bell crank.

The connecting portion 36 of the connecting link 33 has a pair of spaced apart apertures 40, 40 for the pin 39, one of which is adapted to be used when the base 17 and the angle trough 11 are positioned for making a right-hand turn and the other of which is adapted to be used when said base and angle trough are reversed and positioned for making a left-hand turn.

The driving connection from the other lever arm 26 of the bell crank 21 to the driven trough section 14 includes a link 44 pivotally connected to the free end of said lever arm and extending from said lever arm at a generally right angle with respect to said arm, in a direction towards the central arm 22. The free end of said link is pivotally connected with an end of a connecting member 45, by means of a pivotal pin 46. Said connecting member is mounted on and spaced above an upper frame member 47 of a ball frame 49 and is of a T-shaped formation in plan. Pin receiving apertures 48, 48 are provided adjacent opposite ends of the cross of the T to permit the pivotal pin 46 and link 44 to be connected to either end of said connecting member so the position of the angle trough 11 on the base 17 may be reversed and the angle turn may be used for turning left- as well as right-hand corners.

The ball frame 49 is of a well known construction of a type commonly used for shaker conveyers. In the form of ball frame shown, the upper frame member 47 is reciprocably mounted on a lower frame member 50 on balls 51, 51 engaging facing races 52 and 53 on said upper and lower frame members, respectively. Said races, as herein shown, are of a semi-cylindrical formation and are so arranged that said balls may serve as a means for guiding said upper frame member for rectilinear movement with respect to said lower frame member, as well as a support means therefor.

The stem of the T of the connecting member 45 is apertured to receive a pivotal pin 54, extending through a semi-ball-shaped bearing member 55, forming a bearing for the projecting end of a connecting bracket 56, projecting downwardly and rearwardly from a connecting trough section 57, secured to the rear end of the driven trough section 14 in a usual manner, as by bolts 58, 58 extending through aligned connecting eyes 59, 59. The lower end of said pin is mounted in a forwardly projecting portion 60 of the upper frame member 47 of the ball frame 49. The driven trough section 14 may thus pivot with respect to said angle trough in a vertical plane and may also be transversely pivoted with respect thereto, for positioning the driven part of the trough line laterally with respect to the center of the angle trough 11, and positioning the extensible trough section 15 and shovel 16 to gather material from the far corners of a working place.

Referring now in particular to the means for centering the base 17 with respect to the stroke of the conveyer, to cause the angle trough 11 and bell crank 21 to be centered on said base and to prevent the bell crank 21 from imparting a side thrusting action to ball frame 49 and also to prevent the upper frame 47 of the ball frame 49 from being reciprocably moved beyond the limits of the lower frame member of said ball frame, a centering member 63 is herein shown as being secured to the under side of the central supporting arm 22, adjacent its outer end. Said member projects laterally in opposite directions from the center of said arm and is generally perpendicular to the longitudinal axis of said arm. A pair of laterally spaced engaging faces or stops 64, 64 project outwardly from opposite ends of said centering member and are adapted to engage opposite faces 65, 65 of a stop 66, mounted on the base 17.

The stop 66 is herein shown as being of a bifurcated formation and its engaging faces are equally spaced on opposite sides of a radial line bisecting the angle of swinging movement of the angle trough 11. The furcations of said stop slidably engage opposite sides of a channelled guide member 67, which is mounted on a plate 69 secured to the base 17 by means of cap screws 70, 70. Said plate is provided with a depending central boss 71 adapted to register for engagement with an apertured portion 72 of said base plate, to insure the proper positioning of said stop on said base plate (see Figure 3). Said apertured portion is located at the intersection of lines extending through the bosses 19, 19 and bisecting the angle of movement of the angle trough with respect to said bosses, when positioned for turning either a right- or left-hand corner. Thus when it is desired to reverse said angle trough, to turn a left- instead of a right-hand corner, said stop 66 is turned 90 degrees in the aperture 72 and the plate is then secured in position by the cap screws 70, 70.

A compression spring 73 is interposed between the inner side of said channelled guide and the inner side of said stop, for urging said stop in a position out of engagement with the stops 64, 64. A rod 74 projects rearwardly from said stop and is guided within a guide member 75, mounted on said channelled guide. A hand grip 76 is provided on the end of said rod, to permit said stop 66 to be moved against the spring 73 to an operative position and to be held in this position by the hand.

The spacing between the stops 64, 64 is equal to the length of the stroke of the conveyer plus the distance between the engaging faces 65, 65 of the stop 66 so that when the stop 66 is moved inwardly along the channelled guide 67, to a position where the stops 64, 64 will engage opposite engaging faces thereof and the jacks 18, 18 are disengaged from the base 17, the stops 64, 64 will engage the engaging faces 65, 65 of the stop 66 and move said base to such a position that said stops will be midway between the engaging faces 65, 65, at the center of the stroke of the conveyer. At this time said base may be secured in position on the ground by means of the jacks 18, 18.

Thus during operation of the conveyer, the bell crank 21 and angle trough 11 will reciprocably move in central relation with respect to said base and the upper frame member 47 of the ball frame 49 will be reciprocably driven within the limits of the lower frame member of said ball frame, relieving said ball frame and holding jacks 18, 18 from side thrusts which might be caused by improperly positioning said ball frame and base with respect to said bell crank and the stroke of the conveyer and preventing said bell crank from being moved off of said base.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In an angle turn for shaker conveyers, a base, an angle trough mounted on said base for reciprocable movement about a vertical axis, a driven trough arranged to discharge material into said angle trough, a reciprocably movable support means for the rear end of said driven trough, a driving trough arranged at a horizontal angle to said driven trough, for receiving material from said angle trough, and a driving connection between said driving and driven troughs for reciprocably driving said angle trough from said driving trough and for imparting a substantially straight line drive motion to said driven trough, the driving force of which is in alignment with the direction of movement of said support means, said drive connection including a rocking member oscillatively driven by said driving trough, and a link connecting said rocking member with said driven trough, said link being connected with said rocking member at a point spaced forwardly of the discharge end of said driven trough and extending from said rocking member for connection to said driven trough in a direction towards the discharge end of said driven trough.

2. In an angle turn for shaker conveyers, a stationary base, a bell crank mounted on said base for movement about a vertical axis and having an angle trough mounted thereon, a driving trough, a driven trough disposed at an angle with respect to said driving trough section, reciprocable support means on said base for supporting the rear end of said driven trough for reciprocable movement with respect to said base, a linkage connection between said bell crank and said driven trough for driving said support means in a substantially straight line, the driving force of which is in alignment with the direction of movement of said support means, and a linkage connection between said driving trough and said angle trough, permitting said angle trough to be driven from said driving trough when said driving trough is laterally displaced with respect to the center line of the discharge end of said angle trough, including a connecting trough having pivotal connection with said driving trough at one of its ends and with said angle trough at its opposite end.

3. In an angle turn for shaker conveyers, a stationary base, an angle trough mounted on said base for reciprocable movement about a vertical axis, a driving trough, a driven trough at an angle with respect to said driving trough, reciprocable support means on said base for supporting the rear end of said driven trough for reciprocable movement with respect to said base, a linkage connection between said driving trough and said angle trough, permitting said driving trough to reciprocably drive said angle trough when laterally displaced with respect thereto, and a linkage connection between said angle trough and said reciprocable support means for driving said support means from said angle trough in a straight line, the driving force of which is in alignment with the direction of movement of said support means and including a link pivotally connected between said angle trough and said support means and laterally displaced from the center of said support means.

4. In an angle turn for shaker conveyers, a stationary base, an angle trough, a driving trough adapted to reciprocably drive said angle trough about a fixed vertical axis and to receive material discharged from said angle trough, and a driven trough adapted to be driven from said angle trough and to discharge material into said angle trough, reciprocating support means for the rear end of said driven trough including a reciprocably movable frame, a vertical pivotal connection between said frame and said driven trough to permit pivotal movement of said driven trough with respect to said angle trough, and a linkage connection between said driving trough and said reciprocable support means including a bell crank having said angle trough mounted thereon, a link connecting said driving trough with said bell crank, and another link connecting said bell crank with said reciprocating support means, and so arranged as to reciprocably drive said support means from said bell crank in a substantially straight line.

5. In an angle turn for shaker conveyers, a stationary base, an angle trough, a driving trough adapted to reciprocably drive said angle trough about a fixed vertical axis and to receive material discharged from said angle trough, and a driven trough adapted to be driven from said angle trough and to discharge material into said angle trough, reciprocating support means for the rear end of said driven trough including a reciprocably movable frame, a vertical pivotal connection between said frame and said driven trough, to permit pivotal movement of said driven trough with respect to said angle trough, and a linkage connection between said driving trough and said reciprocable support means including a bell crank having said angle trough mounted thereon, a link connecting said driving trough with said bell crank, and another link connecting said bell crank with said reciprocating support means, for reciprocably driving said support means from said bell crank in a substantially straight line, and said link for connecting said driving trough with said bell crank being arranged to permit said bell crank to drive said driving trough when offset from the center thereof and including a connecting trough bridging the gap between said driving trough and said angle trough.

6. In an angle turn for shaker conveyers, a stationary base, an angle trough, a driving trough adapted to reciprocably drive said angle trough about a fixed vertical axis and to receive material discharged from said angle trough, and a driven trough adapted to be driven from said angle trough and to discharge material into said angle trough, and means for centering said base with respect to the stroke of the conveyer comprising a stop, another stop having two engaging faces adapted to engage said first mentioned stop and spaced equally from opposite ends of said first mentioned stop distances equal to half of the stroke of the conveyer when said angle trough is in a centered position on said base, one of said stops being mounted on said base and the other of said stops being reciprocably movable with said angle trough.

7. In an angle turn for shaker conveyers, a stationary base, an angle trough, a driving trough adapted to drive said angle trough about a fixed vertical axis and to receive material discharged from said angle trough, and a driven trough adapted to be driven from said angle trough and to discharge material into said angle trough, a support means mounted on said base for reciprocable movement with respect thereto and forming a support for the rear end of said driven trough, and means for centering said base and said support means with respect to the stroke of the conveyer comprising a stop on said base, another stop reciprocably movable with said angle trough, one of said stops having two engaging faces spaced equally from opposite ends of said other stop distances equal to half of the stroke of the conveyer when said base is in a centered position, and adapted to engage said other stop and move said base to a centered position upon reciprocation of the conveyer.

8. In an angle turn for shaker conveyers, a stationary base, an angle trough, a driving trough adapted to drive said angle trough about a fixed vertical axis and to receive material discharged from said angle trough, and a driven trough adapted to be driven from said angle trough and to discharge material into said angle trough, support means mounted on said base for reciprocable movement with respect thereto and forming a support for the rear end of said driven trough, and means for centering said base and support means with respect to said angle trough comprising a stop having a pair of spaced engaging faces spaced equally from opposite sides of a line extending through the pivotal axis of said angle trough and bisecting the angle of movement of said angle trough when said base is in a centered position, and another stop intermediate said spaced stops and adapted to be engaged thereby, one of said stops being secured to said base and the other of said stops being movable relative to said base and the spacing between said engaging faces being equal to the spacing between opposite faces of said other stop, plus the stroke of the conveyer.

9. In an angle turn for shaker conveyers, a stationary base, an angle trough, a driving trough adapted to drive said angle trough about a fixed vertical axis and to receive material discharged from said angle trough, and a driven trough adapted to be driven from said angle trough and to discharge material into said angle trough, support means mounted on said base for reciprocable movement with respect thereto and forming a support for the rear end of said driven trough, and means for centering said base and support means with respect to the stroke of the conveyer comprising a stop having a pair of engaging faces spaced equally from opposite sides of a line bisecting the angle of movement of said angle trough and another stop intermediate said spaced stops and adapted to be engaged thereby, the spacing between said engaging faces being equal to the spacing between opposite faces of said other stop plus the stroke of the conveyer, one of said stops being secured to said base and the other stop being movable relative to said base, and said stop secured to said base being mounted to normally be in an inoperative position but to be manually moved into an operative position.

10. In an angle turn for shaker conveyers, a base, a bell crank pivotally mounted on said base for movement about a vertical axis, an angle trough mounted on said bell crank, a driving trough having driving connection with said bell crank, a reciprocably movable support frame mounted on said base for reciprocable movement with respect thereto in a fixed rectilinear path, a drive connection between said bell crank and support frame for reciprocably driving said support frame, a driven trough connected to and driven by said support frame, and means for centering said base and support frame with respect to the stroke of the conveyer comprising a stop having a pair of spaced engaging faces spaced equally from opposite sides of a line extending through the pivotal axis of said angle trough and bisecting the angle of movement of said bell crank when said base is in a centered position, another stop intermediate said engaging faces, one of said stops being secured to said bell crank, and the spacing between said engaging faces being equal to the spacing between opposite sides of said other stop plus the stroke of the conveyer.

11. In an angle turn for shaker conveyers, a stationary base, a bell crank pivotally mounted on said base for movement about a vertical axis, an angle trough mounted on said bell crank, a driving trough having driving connection with said bell crank, a reciprocably movable support frame mounted on said base for reciprocable movement with respect thereto in a fixed rectilinear path, a drive connection between said bell crank and support frame for reciprocably driving said support frame, a driven trough connected to and driven by said support frame, and means for centering said base and support frame with respect to the stroke of the conveyer comprising a stop having a pair of spaced engaging faces spaced equally from opposite sides of a line extending through the pivotal axis of said angle trough and bisecting the angle of movement of said bell crank when said base is in a centered position, another stop intermediate said engaging faces, one of said stops being secured to said base and the other of said stops being secured to said bell crank and the spacing between said engaging faces being equal to the spacing between opposite faces of said other stop plus the stroke of the conveyer, and one of said stops being adjustably mounted to normally be moved to an inoperative position but to be held into an operative position by manual pressure.

12. In an angle turn for shaker conveyers, a stationary base, a bell crank pivotally mounted on said base for movement about a vertical axis, an angle trough mounted on said bell crank, a driving trough section having driving connection with said bell crank, a reciprocably movable support frame mounted on said base for reciprocable movement with respect thereto in a fixed rectilinear path, a drive connection between said bell crank and support frame for reciprocably driving said support frame, a driven trough section connected to and driven by said support frame, and means for centering said base and support frame with respect to the stroke of the conveyer including a stop mounted on said bell crank and having a pair of spaced engaging faces, another stop mounted on said base and adapted to be moved into position to be engaged by said engaging faces, and the spacing between said engaging faces being equal to the spacing between opposite faces of said other stop plus the stroke of the conveyer.

WILLIAM W. SLOANE.